United States Patent

[11] 3,602,066

[72] Inventor Arthur E. Wetherbee, Jr.
   Newington, Conn.
[21] Appl. No. 859,014
[22] Filed Sept. 18, 1969
[45] Patented Aug. 31, 1971
[73] Assignee United Aircraft Corporation
   East Hartford, Conn.

[54] HIGH-ENERGY FLYWHEEL
   7 Claims, 5 Drawing Figs.
[52] U.S. Cl. .................................................. 74/572
[51] Int. Cl. .................................................. F16f 15/30
[50] Field of Search .......................................... 74/572;
   233/1, 27, 13; 264/103, 108

[56] References Cited
   UNITED STATES PATENTS
   3,296,886  1/1967  Reinhart, Jr. .................. 74/572
   3,363,479  1/1968  Pickels .......................... 74/572

*Primary Examiner*—William F. O'Dea
*Assistant Examiner*—F. D. Shoemaker
*Attorney*—Charles A. Warren ABSTRACT: A rotary device, for example, a flywheel is built up of layers of circumferentially extending high-strength filaments embedded in a matrix to form a composite with a hub attached for supporting the wheel, in which the characteristics of the composite, at least near the inner diameter, are selected so that under load the hub and wheel are strain compatible where they are connected together.

INVENTOR.
ARTHUR E. WETHERBEE, JR.

BY Charles A. Warren

ATTORNEY

HIGH-ENERGY FLYWHEEL

The invention herein described was made in the course of or under a contract or subcontract thereunder with the Department of the Navy.

SUMMARY OF INVENTION

The present invention relates to high-performance flywheels made up of composites of circumferential fibers in a surrounding matrix and more particularly to the attachment of such flywheels to a supporting hub. The copending application of Wetherbee, Ser. No. 859,013, filed Sept. 18, 1969, describes a composite flywheel in which the filament and/or matrix are varied in one way or another at different radii in order that the wheel will have acceptable stress and strength characteristics at all radii. The present invention is an improvement to that invention in that it provides an attachment for such a wheel to a supporting hub with the materials of the wheel and hub strain compatible.

Accordingly, the principal feature of the invention is the attachment of a composite wheel to a supporting hub in such a manner that the attachment will support the wheel effectively at the high speeds for which the wheel is designed.

According to the invention, the hub is selected of a suitable material and the hub-rim interconnection is selected to have compatibility with both the hub and the rim. The wheel may be of any suitable configuration such as a slab or flat wheel or the more conventional T-shape in cross section.

DESCRIPTION OF THE PREFERRED EMBODIMENT

Figure 1:
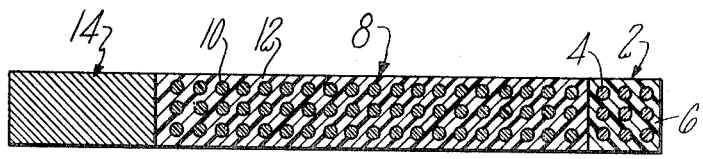
FIG. 1 is a sectional view through a wheel including the hub.
Figure 2:
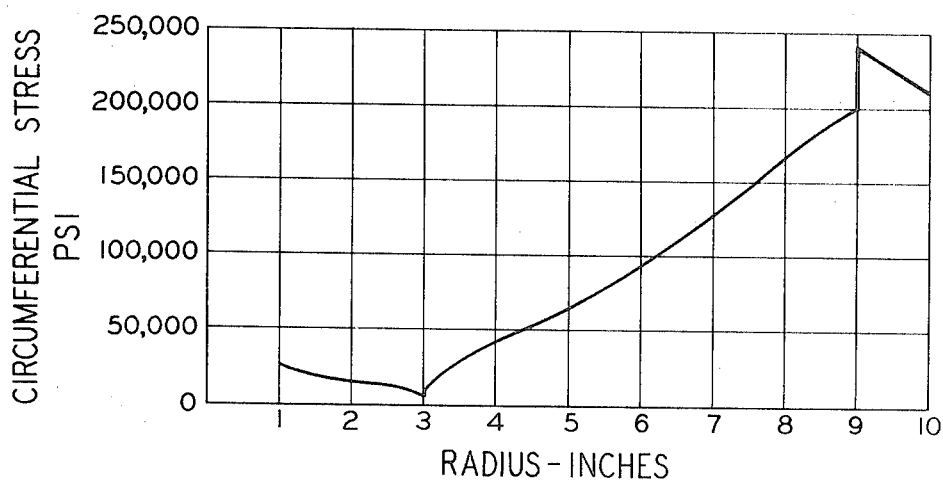
FIG. 2 is a diagram of the circumferential stresses in the wheel.
Figure 3:
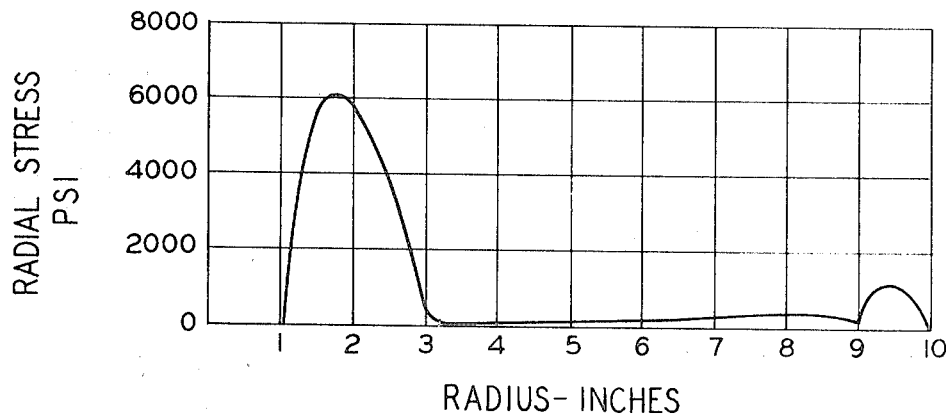
FIG. 3 is a diagram of the radial stresses.

Referring first to FIG. 1, the rim 2 of the wheel is made up of circumferentially extending filaments 4 embedded in a matrix 6. One example of a suitable filament is an "S" Fiberglas, one source for which is Owens Corning. The matrix may be ERL 2256 which is a form of a resin, one source for which is Union Carbide. The filament fraction shown is 65 percent. Radially inward from the rim is the intermediate portion 8 which is also a composite and may be made of "E" Fiberglas filaments 10 in a neoprene matrix 12. This has a relatively large radial dimension, as shown, and is attached at its inner end to the hub 14, which in the arrangement shown is aluminum. It is especially important that the attachment between the rim and intermediate portion be secure enough to hold the rim and intermediate portions together during operation of the flywheel, and similarly the hub and intermediate portion attachment must be secure. To accomplish this the stress at the junctions and the relative strengths and moduli are so selected that the strains on the respective portions during wheel operation are compatible. For example, with hub and intermediate portions joined at the indicated radius and with the proper modulus for the matrix or modulus ratio of the composite high enough the radial stress in both parts is at a minimum, and thus the strain or the deformation of the parts under load will be similar enough that the two parts are compatible and will remain satisfactorily attached during wheel operation.

Figure 4:
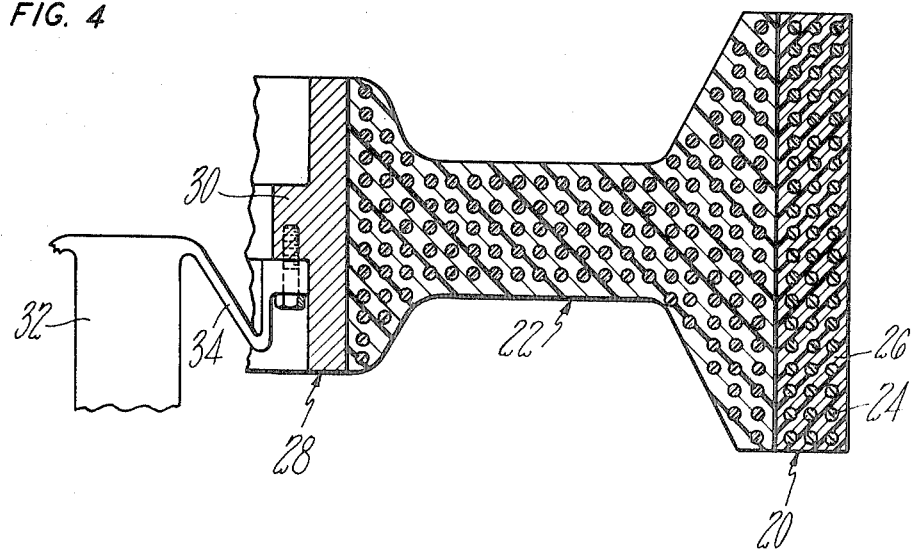
FIG. 4 is a view of another form of wheel and hub.

The same condition is obtained in the construction shown in FIG. 4 which shows a T-configuration of flywheel. In this figure, the rim 20 is wider than the intermediate portion 22 and is made up of a composite of circumferentially extending filaments 24, for example, Fiberglas, in a resin or elastomer matrix 26. The thinner intermediate portion 22 is also made up of a composite which may be similar to the rim but preferably is selected so that the two parts are strain compatible at their area of attachment. Thus the rim may be "S" Fiberglas filaments in a matrix of ERL 2256 with a filament fraction of 65 percent by volume. The intermediate or connecting portion may be of "E" Fiberglas filaments in an elastomeric matrix such as neoprene. Since the radial stresses are much the same at the area of attachment, and the materials are such that they are strain compatible, the line of attachment is not overstressed.

The same condition prevails at the attachment of the intermediate portion to the hub 28. The latter may be, for example, metallic in the form of a relatively thin sleeve having an inner flange 30 to which the shaft 32 is bolted. The latter has a thin rebent annular flange 34 to provide differential expansion between the shaft and the hub resulting from inertial loading at high speeds of rotation.

Figure 5:
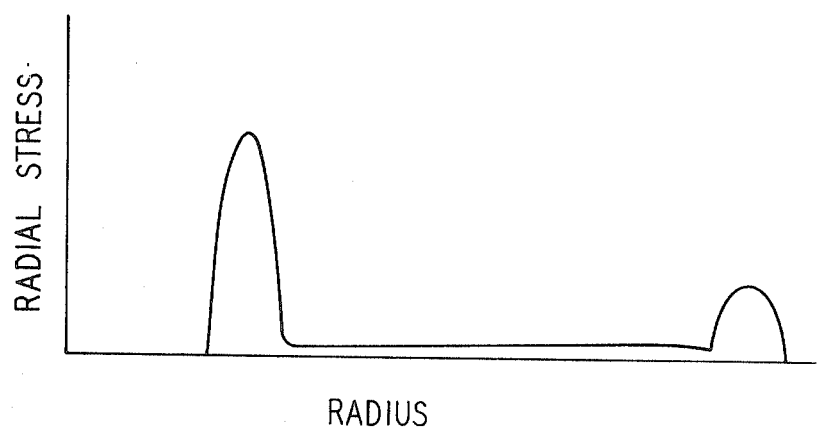
FIG. 5 is a diagram of the radial stresses on the wheel.

As shown in FIG. 5, the radial stresses are such that they are relatively low and similar in amount at the area of attachment between the hub and the intermediate portion. The respective strengths and moduli of the materials involved is such that the resulting strains during wheel operation are compatible and there is no problem of failure of the flywheel at this point.

The rim of this flywheel is subject to very large inertia loads and in operation will experience physical growth through stretching of the filaments and distortion of the matrix as much as 3 percent where Fiberglas filaments are used. The connecting or intermediate portion will be highly stressed by inertia loading near and at its outer periphery and by suitable selection of a composite having a matrix with a low modulus of elasticity, the growth of the connecting portion at its outer dimension can be matched almost exactly to the growth of the rim. This same connecting portion at its inner diameter is very lightly loaded, it will not grow significantly and will thus be strain compatible with the hub.

The distribution of stress in anisotropic structures such as these composites is a function of the modulus ratio which is the ratio of the circumferential modulus of elasticity of the composite to the radial modulus of elasticity. Obviously, this modulus ratio is affected by the materials of the filament and/or the matrix and the filament fraction (the percentage of filament in the composite), as well as the orientation of the filaments. For example, with the same filament fraction, the value of the modulus ratio may be increased by using matrix materials having a low modulus and, within limits the value of the modulus ratio is increased by filaments having higher moduli. Selection of the filament material, filament fraction, and matrix material will therefore permit a control of the value of modulus ratio in order to provide the desired stress and strain distributions throughout the wheel and thus to make the connections between hub and the connecting portion, and between rim and the connecting portion strain compatible. Of these variables, control of the matrix modulus is the most effective.

In order to control the value of the modulus ratio as desired, it is apparent that the rim and connecting portion must be anisotropic, since the value of modulus ratio is 1 for an isotropic material. Thus with rim and connector made of anisotropic materials, the desired result is obtained by making the connector of a material having a modulus ratio substantially higher than that of the rim.

In high-performance wheels made of isotropic material maximum stresses usually occur at or near the hub and failure occurs as a catastrophic breaking of the wheel with failure proceeding along more or less radial lines from the hub to the rim. In flywheels of the present invention, it is possible to select and distribute material properties such that most of the mass of the wheel is in the rim for maximum energy storage, the rim rather than the hub is most highly stressed and the strength, strain and stress characteristics are selected so that overload failure if it occurs may be either due to radial overstress with circumferential cracking of the wheel into concentric layers, or due to circumferential stress with radial cracking and probable fragmentation.

The elastomeric matrix makes possible strain compatibility of the intermediate portion with both rim and hub, contouring of rim and intermediate portion so that most of the mass is in the rim, and connection of a highly stressed rim to a relatively rigid hub.

Under certain conditions both rim and intermediate portions may be of the same composite, one which has a high modulus ratio, for example, Fiberglas in an elastomeric matrix. This composite will provide compatibility with the supporting hub, but will also permit contouring of the wheel to have a very heavy rim and thin integral intermediate portion with strain compatibility between them.

I claim:

1. A rotary structure comprising a rim portion made of a composite of continuous circumferentially extending filaments embedded in a matrix, a metallic hub centrally of the rim, and an annular connecting portion between the hub and the rim and attached at inner and outer edges to the hub and rim respectively, said portion being made of a composite of circumferentially extending filaments embedded in a matrix, with the composite of said portion having a higher modulus ratio than the hub to be strain compatible with the hub when the structure is in operation.

2. A rotary structure as in claim 1 in which the hub and the composite of the rim have lower modulus ratios than the connecting portion to be strain compatible at the areas of attachment therebetween.

3. A rotary structure as in claim 1 in which the matrix of the connecting portion has a lower modulus of elasticity than that of the rim.

4. A rotary structure comprising a rim portion of anisotropic material, a metallic hub, and an annular connector of anisotropic material between the hub and rim and attached to said hub and rim at inner and outer edges of the connector, the material of said connector having a higher modulus ratio than the rim and the hub.

5. A rotary structure as in claim 4 in which the rim and connector both have continuous circumferentially extending filaments embedded in a matrix.

6. A rotary structure as in claim 4 in which the connector is made of a composite of circumferentially extending filaments embedded in a matrix having a low modulus.

7. A rotary structure as in claim 4 in which the rim and connector are made of composites of circumferentially extending filaments embedded in a matrix, the matrix of the connector having a lower modulus of elasticity than that of the rim.